(12) United States Patent
Purdy et al.

(10) Patent No.: US 11,668,047 B2
(45) Date of Patent: Jun. 6, 2023

(54) USE OF A 2 LIQUID PHASE SYSTEM IN BIOMASS DELIGNIFICATION

(71) Applicant: SixRing Inc., Calgary (CA)

(72) Inventors: Clay Purdy, Medicine Hat (CA); Markus Weissenberger, Calgary (CA); Markus Pagels, Calgary (CA); Kyle G Wynnyk, Calgary (CA); Matthew DeWit, Calgary (CA); Andrew M Corbett, Calgary (CA)

(73) Assignee: SixRing Inc., Calgary (CA)

( * ) Notice: Subject to any disclaimer, the term of this patent is extended or adjusted under 35 U.S.C. 154(b) by 0 days.

(21) Appl. No.: 17/405,027

(22) Filed: Aug. 18, 2021

(65) Prior Publication Data
US 2022/0186435 A1 Jun. 16, 2022

(30) Foreign Application Priority Data
Dec. 11, 2020 (CA) ................................ CA 3102538

(51) Int. Cl.
*D21C 3/04* (2006.01)
(52) U.S. Cl.
CPC ...................................... *D21C 3/04* (2013.01)
(58) Field of Classification Search
CPC .... D21C 1/04; D21C 3/04; D21C 3/20; Y02E 50/30; Y02W 30/62
See application file for complete search history.

(56) References Cited

U.S. PATENT DOCUMENTS 3,962,030 A * 6/1976 Sullivan ............... D21C 9/1089
162/83
2014/0069599 A1* 3/2014 Bryant ................ D21C 9/1005
162/77

FOREIGN PATENT DOCUMENTS

CN 109930416 A * 6/2019
WO WO-2018197222 A1 * 11/2018 ............... B27N 1/00

OTHER PUBLICATIONS

CN109930416A English Translation (Year: 2019).*

* cited by examiner

*Primary Examiner* — Ellen M McAvoy
*Assistant Examiner* — Chantel L Graham
(74) *Attorney, Agent, or Firm* — FisherBroyles, LLP; James W. Hill; Andrew K. Gonsalves

(57) ABSTRACT

Method for controlled delignification of lignocellulosic feedstock, said method comprising the steps of:
providing a reactive phase of pH less than 1, said reactive phase comprising:
water;
sulfuric acid;
a source of peroxide;
a modifying agent, said modifying agent adapted to control the reactivity of the sulfuric acid;
providing a holding phase, said holding phase comprising an organic solvent which does not react with the aqueous acidic composition;
combining said reactive phase and holding phase to form a reaction mixture;
exposing a lignocellulosic material to said reaction mixture for a period of time sufficient to allow delignification of the lignocellulosic material.

20 Claims, No Drawings

USE OF A 2 LIQUID PHASE SYSTEM IN BIOMASS DELIGNIFICATION

FIELD OF THE INVENTION

The present invention is pertaining to a method and composition for decomposing organic material and post treatment extraction of constituents.

BACKGROUND OF THE INVENTION

Fossil fuel-based organic products include a vast array of end use and precursor products such as surfactants, pharmaceuticals, plastics, fuels, polymers, aromatics and elastomers which are abundant in all aspects of manufacturing consumer products and fuels which are used in all aspects of the global economy. Climate change, environmental and political pressures are forcing industry to find alternatives to fossil fuels and petroleum-based products that are carbon-neutral, renewable and economic. A well-known source of many commercialized non-fossil-fuel based products is lignocellulosic biomass but there is yet a scalable, economical process to extract these valuable constituents. Lignin is the second most abundant biopolymer of lignocellulosic biomass after cellulose. This is the single most abundant source of carbon-neutral organic materials on the planet and contains most of the required compounds to sustain multiple industries including, but not limited to, energy production, chemicals, polymers, food, pharmaceuticals, high strength concrete, various manufacturing and agriculture applications.

There are billions of tons of lignocellulosic biomass being produced by biosynthesis every year. However, economical and scalable processes to efficiently separate the three components of lignocellulosic biomass proves to be a challenge. In order for lignocellulosic biomass to be a strong and legitimate competitor or potentially a complete alternative to fossil fuel petroleum-based products new processes and chemical treatments need to be developed. To benefit from lignocellulosic biomass and to be able to further utilize it in industry, one must be able to separate the lignin from the hemicellulose and the cellulose in an economical, commercially viable process. Cellulose is an abundant, high molecular weight natural polymer that possesses great strength, has high biodegradability and is sustainable. Depending on the feedstock, cellulose can make up from 40 to 60 percent by weight, or in some cases more of the plant material and is found in trees, forestry residue, algae, crops, various plants, municipal and industrial waste.

Furthermore, due to cellulose encasement between lignin and hemicellulose, the efficient and commercially viable extraction of cellulose will depend greatly on the method and biomass source being utilized during the extraction process. Many current and proposed processing methods may limit the use or alter the structural integrity of the cellulose resulting in a marginal yield and excessive processing costs. Most commercial processes begin with already processed pulp, generally from the Kraft process which degrades the biomass in some aspects and requires massive inputs of energy in the form of heat and pressure. A process that requires little to no input of energy and minimal capital expenditure for processing facilities or is able to utilize existing infrastructure is highly desirable. In addition, processes that can utilize feedstock that does not require it to be pre-treated, other than general cleaning/milling, is highly desirable.

It is widely agreed that the technical difficulties in the known current processes are currently inefficient, expensive and difficult to scale. The separation of lignin and hemicellulose from the cellulose in the biomass is what prevents such known technology from being a viable alternative for petroleum-based or fossil fuel products on a global scale or even a localized viable scale. In addition, the desire for these materials in an economical manner from other industries is very large. These include, but are not limited to, pharmaceuticals, food production, cosmetics, manufacturing, chemicals, polymers and fuels production. Many of the liquid hydrocarbon molecules yielded from biomass can be utilized or processed using much of the current oil & gas global infrastructure such as pipelines, processing facilities, upgraders, along with downstream assets such as gas stations, once the biomass has been converted to fuels. This makes woody biomass the only real alternative to hydrocarbons as the next source of energy for the human race that is arguably carbon-neutral or close to carbon-neutral, and that would likely keep much of the current global mid-stream and down-stream energy assets in use and commercially viable while retaining many millions of jobs with minimal economic disruption. Much of these multi-trillion-dollar assets and many millions of jobs globally would be lost with other alternative energy sources such as solar or wind. A viable source of energy from woody biomass would also make the internal combustion engine carbon-neutral thus retaining other global trillion-dollar industries with minimal interruption such as the airline industry, the automotive industry and the many hundreds of ancillary support industries.

The first step in paper production, and most energy-intensive step, is the production of pulp. This is one of the current few large and mature sources of cellulosic material, although it is very inefficient, polluting and energy intensive. Notwithstanding water, wood and other plant materials used to make pulp contain three main components: cellulose; lignin; and hemicellulose. Pulping has a primary goal to separate the fibres from the lignin. In general, cellulose extracted from plant materials contains both amorphous regions and a crystalline regions. Lignin is a three-dimensional crosslinked polymer which figuratively acts as a mortar or binding agent to hold all the fibres together within the plant. Its presence in finished pulp is undesirable and adds no industrial value to the finished product. Pulping wood refers to breaking down the bulk structure of the fibre source, be it chips, stems or other plant parts, into the constituent fibres. The cellulose fibres are the most desired component with regards to paper manufacturing. Hemicelluloses are shorter branched carbohydrate polymers consisting of various monosaccharides which form a random amorphous polymeric structure. The presence of hemicellulose in finished pulp is also regarded as bringing no value to a paper product. This is also true for biomass conversion. The challenges are similar. Only the desired outcome and constituents are different. Optimal biomass conversion would have the further breakdown to monosaccharides as a desired outcome, while the common pulp & paper processes normally stop right after lignin dissolution. With the process taught in this patent, there would be many additional valuable constituents including, but not limited to, microcrystalline cellulose (MCC), nanocrystalline cellulose (NCC) and cellulose nanofibres (CNF) along with other valuable commercial products yielded from the process effluent such as aromatic monomers.

There are two main approaches to processing wood pulp or woody biomass: mechanical treatment and chemical treatment. Mechanical treatment, or pulping, generally consists of mechanically tearing the biomass feedstock apart and, thus, tearing cellulose fibres in an effort to distinctly separate them from each other for further processing. The shortcomings of this approach include: damaged or broken cellulose fibres, thus shorter fibres and lignin being left on the cellulose fibres thus being inefficient or non-optimal for most commercial applications without further, expensive processing. The current process also consumes large amounts of energy, is polluting and is capital intensive. There are several approaches included in chemical pulping. These are generally aimed at the depolymerization of the lignin and hemicellulose into small, water-soluble molecules. These now degraded or processed components can be separated from the cellulose fibres by washing the latter without depolymerizing the cellulose fibres. The current, globally commercialized chemical process is energy intensive requiring high amounts of heat and/or high pressures; in many cases, agitation or mechanical intervention are also required, further adding inefficiencies and costs to the process. With this process, much of the effluent is waste product.

There exist pulping or treatment methods which combine, to a various extent, the chemical aspects of pulping with the mechanical aspects of pulping. To name a few, one must consider thermomechanical pulping (also commonly referred to as TMP), and chemi-thermomechanical pulping (CTMP). Through a selection of the advantages provided by each general pulping method, the treatments are designed to reduce the amount of energy required by the mechanical aspect of the pulping treatment. This can also directly impact the strength or tensile strength degradation of the fibres subjected to these combination pulping approaches and thus the commercial viability. Generally, these approaches involve a shortened chemical treatment times (compared to conventional exclusive chemical pulping) which is then typically followed by mechanical treatment to separate the fibres.

The most common process to make pulp for paper production is the kraft process. In the kraft process, wood chips are converted to wood pulp which is almost entirely pure cellulose fibres. The multi-step kraft process consists of a first step where wood chips are impregnated/treated with a chemical solution. This is done by soaking the wood chips and then pre-heating the wood chips with steam. This step swells the wood chips and expels the air present in the wood chips and replaces the air with the treatment liquid. This produces black liquor, a resultant by-product from the kraft process. It contains water, lignin residues, hemicellulose and inorganic chemicals. White liquor is a strong alkaline solution comprising sodium hydroxide and sodium sulfide. Once the wood chips have been soaked in the various chemical solutions, they undergo cooking. To achieve delignification in the wood chips, the cooking is carried out for several hours at temperatures reaching up to 176° C. At these temperatures, the lignin degrades to yield water soluble fragments. The remaining cellulosic fibres are collected and washed after the cooking step.

U.S. Pat. No. 5,080,756 teaches an improved kraft pulping process and is characterized by the addition of a spent concentrated sulfuric acid composition containing organic matter to a kraft recovery system to provide a mixture enriched in its total sulfur content that is subjected to dehydration, pyrolysis and reduction in a recovery furnace. The organic matter of the sulfuric acid composition is particularly beneficial as a source of thermal energy that enables high heat levels to be easily maintained to facilitate the oxidation and reduction reactions that take place in the furnace, thus resulting in the formation of sulfide used for the preparation of cooking liquor suitable for pulping.

Caro's acid, also known as peroxymonosulfuric acid ($H_2SO_5$), is one of the strongest oxidants known and can be explosive in its pure form. There are several known reactions for the preparation of Caro's acid, but one of the most straightforward involves the reaction between sulfuric acid ($H_2SO_4$) and hydrogen peroxide ($H_2O_2$). Preparing Caro's acid in this method allows one yield in a further reaction of potassium monopersulfate (PMPS) which is a valuable bleaching agent and oxidizer. While Caro's acid has several known useful applications, one noteworthy is its use in the delignification of wood. But because of its reactivity and dangers associated therewith, it is not a preferred approach to treat large volumes of material such as lignocellulosic biomass or feedstock.

Other methods have been developed for pretreating lignocellulosic feedstocks. These pretreatment methods include dilute acid pretreatment, steam explosion (CO2 explosion), pH-controlled water pretreatment, ammonia fibre expansion, ammonia recycle percolation (ARP), and lime pretreatment (Mosier et al. 2005; Wyman et al. 2005; Yang and Wyman 2008). One approach involves the concept of organosolv. Organosolv pulping is the process to extract lignin from lignocellulosic feedstocks with organic solvents or their aqueous solutions. Organosolv pulping has attracted interest since the 1970's because the conventional pulping processes, kraft and sulfite processes, have some serious shortcomings such as air and water pollution. Organosolv pretreatment is similar to organosolv pulping, but the degree of delignification for pretreatment is not expected/required to be as high as that of pulping. However, a drawback of organosolv pre-treatment is the high temperatures at which the processes are known to be carried out at, upwards of 100-250° C., often times in the range of 185-210° C. Such temperatures require high energy inputs.

Improved processes for delignification need to take into account environmental aspects as well as end-product generation. Ambient temperature processes (20-30° C.) are highly desirable as they do not require energy intensive inputs. However, to carry out delignification operations at low temperatures and atmospheric pressure, strong acids are typically required. The strength of the acids used while sufficient to remove lignin present on the lignocellulosic feedstock, can be deleterious to the lignin as it decomposes it beyond any lignin monomers which would be useable in other industries or applications, but can also damage the cellulose being yielded and therefore fail in delivering useable products from said feedstock.

One approach is to modify the acid by incorporating a modifying agent which tempers its reactivity and allows for more controlled/controllable reaction with the lignocellulosic feedstock. According to a preferred embodiment of the present invention, this step will allow for far more control in preventing cellulosic degradation from exposure to the acid systems. However, the presence of a modifying agent will not necessarily prevent the extensive depolymerization of lignin as it is being separated from the cellulose and hemicellulose.

Biofuel production is another potential application for the kraft process. One of the current drawbacks of biofuel production is that it typically requires the use of food grade plant parts (such as seeds) in order to transform the easily accessible carbohydrates into fuel in a reasonably efficient process. The carbohydrates could be obtained from cellulosic fibres, by using non-food grade biomass in the kraft process; however, the energy intensive and destructive nature of the kraft process for delignification makes this a less commercially viable option. In order to build a plant based chemical resource cycle there is a great need for energy efficient processes which can utilize plant-based feedstocks that do not compete with human food sources and which are generally inexpensive to produce.

Research (HUNTLEY, C. "Influence of Strong Acid Hydrolysis Processing on the Thermal Stability and Crystallinity of Cellulose Isolated from Wheat Straw", 2014) has shown that extraction of cellulose from an agricultural waste product such as wheat straw using strong acid hydrolysis such as sulfuric and nitric acids will yield similar crystalline and thermal properties as currently reported in the literature. However, the effect of various strong acids on the polymeric, structural, and thermal properties of cellulose extracted from wheat straw impacted the crystallinity of the end product cellulose and it was found to be desirable to use weaker acids where the crystallinity of the final cellulose product is of importance.

In addition to the recovery of cellulose, the recovery of lignin is increasingly important. Most conversion technologies relating to dissolved lignin use heat and metal catalysts to effectively break down lignin into low molecular weight aromatics which hold value for other uses/applications across industry. Some of the considerations to take into account when exploring various processes include: efficiency of the catalysts used; the stability of the catalysts; control of the condensation and repolymerization reactions of lignin. The condensation and repolymerization of lignin often yield products which cannot be broken down easily using the conventional approaches and therefore lose a tremendous amount of value in terms of future uses/applications in industry. The condensation and repolymerization of lignin have a direct impact on the recovery of target lignin products (such as low molecular weight phenolic compounds). Thus, avoiding the condensation and repolymerization reactions is critical in order to maximize the yields of the target products.

The lignin repolymerization has been a substantial concern during many stages of the process of the delignification of lignocellulosic biomass. Conventional fractionation process, namely biomass pretreatment, focuses on its effectiveness to remove lignin from biomass structure, generally employing acid or base catalysts. The resulting residual solid, mainly lignin, significantly undergoes irreversible repolymerization depending on the pretreatment conditions. This is an outcome which must be avoided in order to extract maximum value from a treatment which is geared at recovering both cellulose and lignin for future uses.

While the kraft pulping process is the most widely used chemical pulping process in the world, it is extremely energy intensive and has other drawbacks, for example, substantial odours emitted around pulp producing plants or general emissions that are now being highly regulated in many pulp and paper producing jurisdictions as well as being destructive to many of the commercially important constituents of the plant matter. In light of the current environmental challenges, economic challenges and climatic changes, along with emission fees being implemented by governments, it is highly desirable to optimize the current pulping processes in order to provide at least linear quality fibres without the current substantial detriment to the environment during the production thereof.

Accordingly, there still exists a need for a composition capable of performing delignification on lignocellulosic biomass under reduced temperatures and pressures versus what is currently in use without requiring any major additional capital expenditures and adapted to preserve the lignocellulosic biomass constituents as much as possible for further applications. In addition, when heat and pressure are removed from the process the capital expenditures are greatly reduced as plastics, such as high-density polyethylene (HDPE) can be utilized versus glass lined metals for piping, reactors and associated equipment.

There are two common processes used in the pulp and paper industry to produce pulp out of plant biomass which are the kraft and the sulfite process. Both processes are very energy intensive and produce a large amount of harmful contaminated waste water. There are high temperatures and pressures applied to separate lignin from cellulose. A by-product of these processes is the so-called liquor which contains organic substances that result from partial depolymerization of lignin, hemicellulose and cellulose. These depolymerization products need to be separated from the liquor by distillation or extraction. Another method of separation is the change in solubility by adding another solvent to the liquor in a way that the substances become insoluble and can be filtered out as solids.

European patent EP 2257669 B1 teaches a liquid fractionation composition, comprising: biomass, an ionic liquid, and a fractionation polymer, wherein the composition is bi-phasic and comprises a fractionation polymer rich liquid phase and an ionic liquid rich liquid phase, and wherein the composition is substantially free of water, preferably less than 1 percent by weight water, said composition optionally further comprising a processing aid, catalyst, surfactant, preservative, anti-microbial, or combination thereof. The method of fractioning biomass, is stated to comprise the following steps: a) providing a liquid fractionation composition comprising the biomass, an ionic liquid, and a fractionation polymer, wherein the liquid fractionation composition is substantially free of water and wherein the liquid fractionation composition is mono-phasic at a temperature; and b) adjusting the temperature of said mono-phasic liquid fractionation composition to provide a biphasic composition as claimed in any of claims 1-10, preferably by cooling, e.g. to less than 60° C. wherein a portion of the biomass is fractioned between each phase of the biphasic composition; and optionally c) separating the two phases of the biphasic composition. The reaction step is carried out at temperatures above 80° C. for a duration of 20 hours or more.

U.S. Pat. No. 7,763,715B2 teaches methods for using ionic liquids to extract and separate a biopolymer from a biomass containing the biopolymer are disclosed. Methods for dissolving a biopolymer in an ionic liquid are also disclosed. A recovery solvent is used to reduce the solubility of the biopolymer in the ionic liquid and conventional separation techniques are used to recover the biopolymer. Biopolymers encompassed by the teachings include chitin, chitosan, elastin, collagen, keratin and polyhydroxyalkanoate.

In light of the current environmental challenges, economic challenges and climactic changes, along with emission fees being implemented, it is highly desirable to develop pulping processes which take into account those environmental challenges without impacting the price of the end products. Accordingly, there still exists a need for a composition capable of performing delignification on wood substance under reduced temperatures and pressures versus what is currently in use without requiring any additional capital expenditures.

SUMMARY OF THE INVENTION

According to an aspect of the present invention, there is provided a system to treat lignocellulosic biomass to enhance the rate of the delignification reaction and to isolate compounds/products which are hydrophobic by providing a hydrophobic phase where such compounds can migrate to and remain. Preferably, the system comprises a reaction phase where the lignocellulosic feedstock is processed and generates degraded end products comprising: cellulose, hemicellulose and lignin, as well as their respective breakdown products—oligomers and monomers, and a holding phase comprised of a less polar solvent where end products such as lignin oligomers and monomers migrate to until an extraction is carried out to remove such.

Preferably, the holding phase of the system comprises an organic phase comprising a compound selected from the group consisting of: $C_5$-$C_{10}$ hydrocarbons; $C_5$-$C_{10}$ carboxylic acids; o-, m-, and p-chloronitrobenzene; o-, m-, and p-xylene; $C_5$-$C_{10}$ alkyl acetate; and combinations thereof.

More preferably, the holding phase of the system comprises an organic phase comprising a compound selected from the group consisting of: toluene; ethyl acetate; hexanoic acid; octanoic acid; i-octane; and nitrobenzene. Even more preferably, the holding phase comprises propyl acetate; ethyl acetate; and combinations thereof.

According to an aspect of the present invention, there is provided a method for controlled delignification of lignocellulosic feedstock of acidic chemicals, said method comprising the steps of:
  providing a reactive phase of pH less than 1, said reactive phase comprising:
    water;
    sulfuric acid;
    a source of peroxide;
    a modifying agent, said modifying agent adapted to control the reactivity of the sulfuric acid;
  providing a holding phase, said holding phase comprising an organic solvent which does not react in a significant amount (i.e. not enough to eliminate phase separation) with the aqueous acidic composition;
  combining said reactive phase and holding phase to form a reaction mixture;
  exposing a lignocellulosic material to said reaction mixture for a period of time sufficient to allow delignification of the lignocellulosic material.

Preferably, the reactive phase and the holding phase are present in a weight ratio ranging from 2:1 to 1:2. More preferably, the reactive phase and the holding phase are present in a weight ratio ranging from 1.5:1 to 1:1.5.

According to a preferred embodiment of the present invention, the holding phase comprises a solvent selected from the group consisting of partitioning solvents in water. More preferably, the holding phase comprises a solvent selected from the group consisting of: ethyl acetate; propyl acetate; butyl acetate; and combinations thereof.

According to a preferred embodiment of the present invention, the sulfuric acid and the source of peroxide are present in a molar ratio ranging from 3:1 to 1:3. According to another preferred embodiment of the present invention, the sulfuric acid and the modifying agent are present in a molar ratio ranging from 10:1 to 1:10. Preferably, the sulfuric acid and the modifying agent are present in a molar ratio ranging from 3:1 to 1:3. According to another preferred embodiment of the present invention, the sulfuric acid and the modifying agent are present in a molar ratio ranging from 3:1 to 1:1.

According to a preferred embodiment of the present invention, the modifying agent is selected from the group consisting of: sulfamic acid; imidazole; taurine; a taurine derivative; a taurine-related compound; alkylsulfonic acid; aryl sulfonic acid; triethanolamine; and combinations thereof. Preferably, the taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

According to an aspect of the present invention, there is provided a method of delignification of plant material, said method comprising:
  providing said plant material comprising cellulose fibres and lignin;
  exposing said plant material requiring to a composition comprising:
    an acid;
    a modifying agent; and
    a peroxide;
  for a period of time sufficient to remove substantially all (at least 80%) of the lignin present on said plant material. Preferably, the amount of lignin removed is more than 90%.

According to an aspect of the present invention, there is provided a one-pot process to separate lignin from a lignocellulosic feedstock, said process comprising the steps of:
  providing a vessel;
  providing said lignocellulosic feedstock;
  providing a composition comprising;
    an acid;
    a modifying agent; and
    a peroxide;
  exposing said lignocellulosic feedstock to said composition in said vessel for a period of time sufficient to remove substantially all of the lignin present said lignocellulosic feedstock;
  optionally, removing a liquid phase comprising dissolved lignin fragments from a solid phase comprising cellulose fibres.

According to another preferred embodiment of the present invention, the modifying agent selected from the group consisting of: sulfamic acid; imidazole; n-alkylimidazole; taurine; a taurine derivative; a taurine-related compound; alkylsulfonic acid; aryl sulfonic acid; triethanolamine; and combinations thereof. Preferably, the alkylsulfonic acid is selected from the group consisting of: methanesulfonic acid; ethanesulfonic acid; propanesulfonic acid and combinations thereof. Also preferably, the aryl sulfonic acid is selected from the group consisting of: toluenesulfonic acid; benzenesulfonic acid; and combinations thereof.

Preferably, said modifying agent is a compound comprising an amine moiety and a sulfonic acid moiety is selected from the group consisting of: taurine; taurine derivatives; and taurine-related compounds. Preferably also, said taurine derivative or taurine-related compound is selected from the group consisting of: sulfamic acid; taurolidine; taurocholic acid; tauroselcholic acid; tauromustine; 5-taurinomethyluridine and 5-taurinomethyl-2-thiouridine; homotaurine (tramiprosate); acamprosate; and taurates; as well as aminoalkylsulfonic acids where the alkyl is selected from the group consisting of $C_1$-$C_5$ linear alkyl and $C_1$-$C_5$ branched alkyl. Preferably, the alkyl moiety in said linear alkylaminosulfonic acid is selected form the group consisting of: methyl; ethyl (taurine); propyl; and butyl. Preferably, the alkyl moiety in said branched aminoalkylsulfonic.

According to another preferred embodiment of the present invention, the modifying agent comprises a compound containing an amine group and a compound comprising a sulfonic acid moiety. Preferably, the compound containing an amine group has a molecular weight below 300 g/mol. Also preferably, said compound containing an amine group has a molecular weight below 150 g/mol. More preferably, said compound containing an amine group is a secondary amine. Even more preferably, said compound containing an amine group is triethanolamine.

Preferably, said compound comprising a sulfonic acid moiety is selected from the group consisting of: alkylsulfonic acid; and arylsulfonic acid. More preferably, the arylsulfonic acid is selected from the group consisting of: orthanilic acid; metanilic acid; sulfanilic acid; benzenesulfonic acid; and toluenesulfonic acid.

According to another preferred embodiment of the present invention, the temperature of the composition prior to the step of exposing it to the lignocellulosic feedstock is below 50° C. Preferably, the temperature of the composition prior to the step of exposing it to the lignocellulosic feedstock is below 40° C. More preferably, the temperature of the composition prior to the step of exposing it to the lignocellulosic feedstock is below 30° C. Most preferably, the temperature of the composition prior to the step of exposing it to the lignocellulosic feedstock is below 25° C.

According to another aspect of the present invention, there is provided a one-pot process to separate lignin from a lignocellulosic feedstock, said process comprising the steps of:
  providing a vessel;
  providing said lignocellulosic feedstock;
  providing a composition comprising;
    an acid;
    a modifying agent;
    a peroxide;
  exposing said lignocellulosic feedstock to said composition in said vessel creating a reaction mixture, wherein the exposure is done for a period of time sufficient to remove substantially all (at least 80%) of the lignin present said lignocellulosic feedstock;
  exposing the reaction mixture to a water immiscible solvent;
  removing a liquid phase comprising:
    said water immiscible solvent; and
    dissolved lignin fragments;
  from a solid phase comprising cellulose fibres.

According to a preferred embodiment of the present invention, the period of time is sufficient to remove at least 90% of the lignin present on said plant material. More preferably, the period of time is sufficient to remove at least 95% of the lignin present on said plant material.

According to a preferred embodiment of the present invention, the water immiscible solvent is selected from the group consisting of: ethyl acetate; propyl acetate; butyl acetate; and combinations thereof.

According to another preferred embodiment of the present invention, the water immiscible solvent is selected from the group consisting of: xylene; hexane; toluene and combinations thereof.

According to a preferred embodiment of the present invention, the method is carried out at ambient temperature. According to a preferred embodiment of the present invention, the method is carried out at atmospheric pressure.

DESCRIPTION OF THE INVENTION

The experiments carried out using an aqueous acidic composition according to a preferred embodiment of the present invention have shown that various lignocellulosic biomass components (such as wood chips, straw, alfalfa, etc.) can undergo delignification under controlled reaction conditions and eliminate or at least minimize the degradation and/or depolymerization of the cellulose as well as provide lignin depolymerization products which are soluble (i.e. separated from cellulose). Degradation is understood to mean a darkening of cellulose, which is symbolic of an uncontrolled acid attack on the cellulose and staining thereof.

In the disclosed methods and compositions, biomass is used and/or fractioned. The term "biomass," or "lignocellulosic biomass" as used herein, refers to living or dead biological material that can be used in one or more of the disclosed processes. Biomass can comprise any cellulosic or lignocellulosic material and includes materials comprising cellulose, and optionally further comprising hemicellulose, lignin, starch, oligosaccharides and/or monosaccharides, biopolymers, natural derivatives of biopolymers, their mixtures, and breakdown products (e.g., metabolites). Biomass can also comprise additional components, such as protein and/or lipids. Biomass can be derived from a single source, or biomass can comprise a mixture derived from more than one source. Some specific examples of biomass include, but are not limited to, bioenergy crops, agricultural residues, municipal solid waste, industrial solid waste, sludge from paper manufacture, yard waste, wood and forestry waste. Additional examples of biomass include, but are not limited to, corn grain, corn cobs, crop residues such as corn husks, alfalfa, corn stover, grasses, wheat, wheat straw, hay, rice straw, switchgrass, waste paper, sugar cane bagasse, sorghum, soy, components obtained from milling of grains, trees (e.g., pine), branches, roots, leaves, wood chips, wood pulp, sawdust, shrubs and bushes, vegetables, fruits, flowers, animal manure, multi-component feed, and crustacean biomass (i.e., chitinous biomass).

EXAMPLES

The composition according to a preferred embodiment of the present invention used in the delignification test was prepared by preparing a modified acid comprising taurine and sulfuric acid. This modified acid was prepared by dissolving 1 molar equivalent of taurine into sulfuric acid and subsequently adding hydrogen peroxide.

Carrying out delignification of lignocellulosic biomass using a method according to a preferred embodiment of the present invention provides for several advantages, including but not limited to: increase in the rates of reaction by shifting the equilibrium chemical reaction towards the product side; reducing the overall process time; and allow "on-the-fly" separation of potential products which are not water-soluble but which are soluble in an organic solvent. Additional advantages of the present invention will be set forth in part in the description that follows, and in part will be obvious from the description, or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

According to a preferred embodiment of the method of the present invention, a composition comprising sulfuric acid:taurine:hydrogen peroxide in a 5.0:1.0:1.0 molar ratio is used. The resulting pH of the composition is less than 1. Preferably, the resulting pH of the composition was less than 0.5. A range of compositions with the same components were prepared and the delignification testing carried out on those compositions are reported in Tables 1-8.

The compositions were clear and odorless with densities ranging between 1.1 and 1.8 g/cm$^3$.

When performing delignification of wood using a composition according to a preferred embodiment of the present invention, the process can be carried out at substantially lower temperatures than temperatures used in the conventional kraft pulping process. The advantages are substantial, here are a few: the kraft pulping process requires temperatures in the vicinity of 176-180° C. in order to perform the delignification process, a preferred embodiment of the process according to the present invention can delignify wood at far lower temperatures, even as low as 20° C. According to a preferred embodiment of the present invention, the delignification of wood can be performed at temperatures as low as 30° C. According to another preferred embodiment of the present invention, the delignification of wood can be performed at temperatures as low as 40° C. According to yet another preferred embodiment of the present invention, the delignification of wood can be performed at temperatures as low as 50° C. According to yet another preferred embodiment of the present invention, the delignification of wood can be performed at temperatures as low as 60° C. Other advantages include: a lower input of energy; reduction of emissions and reduced capital expenditures; reduced maintenance; lower shut down/turn around costs; also, there are HSE advantages compared to conventional kraft pulping compositions.

In each one of the above preferred embodiments, the temperature at which the processes are carried out are substantially lower than the current energy-intensive kraft process.

Moreover, the kraft process uses high pressures to perform the delignification of wood which is initially capital intensive, dangerous, expensive to maintain and has high associated turn-around costs. According to a preferred embodiment of the present invention, the delignification of wood can be performed at atmospheric pressure. This, in turn, circumvents the need for highly specialized and expensive industrial equipment such as pressure vessels/digestors. It also allows the implementation of delignification units in many of parts of the world where the implementation of a kraft plant would previously be impracticable due to a variety of reasons.

Some of the advantages of a process according to a preferred embodiment of the present invention, over a conventional kraft process are substantial as the heat/energy requirement for the latter is not only a great source of pollution but is, in large part, the reason the resulting pulp product is so expensive and has high initial capital requirements. The energy savings in the implementation of a process according to a preferred embodiment of the present invention would be reflected in a lower priced pulp and environmental benefits which would have both an immediate impact and a long-lasting multi-generational benefit for all.

Further cost savings in the full or partial implementation of a process according to a preferred embodiment of the present invention, can be found in the absence or minimization of restrictive regulations for the operation of a high temperature and high-pressure pulp digestors.

A 2 immiscible liquids phase system can increase reaction rates when compounds are exposed to two non-miscible solvents that retain the feed material and reaction products differentially. For these biomass reactions, an aqueous "reaction phase" is used to hold all of the initial components and the feedstock, which in this case pertains to the plant biomass and the acid/peroxide mixture.

Once the degradation reaction has started, the products are gradually transferred into the non-reactive "holding phase". Preferably, vigorous agitation is used to increase contact between the two phases and so to maximize transfer of reaction products that are soluble in the holding phase. Removing reaction products "on the fly" during the reaction can reduce the overall processing time as potential equilibrium reactions are pushed towards the product side. The plant biomass is not soluble in either of the liquid phases and residuals can be filtered off at the end of the reaction process.

Experiments

Experiments were carried out using various organic solvents to determine whether the delignification reaction could be improved by having a 2-phase system which would allow dissolved lignin fragments to migrate into an organic (holding) phase and allow to push the reaction in the aqueous phase towards increased delignification or faster delignification.

Several solvents were selected to provide a holding phase for dissolved lignin fragments. Among the solvents analyzed, there was toluene, ethyl acetate, octanoic acid; isooctane, hexanoic acid and nitrobenzene. Experiments involving the latter two solvents could not be completed as there was a reaction occurring between the acidic composition and the organic solvent which contaminated the reaction medium.

The experiments with the remaining solvents were carried out at room temperature under atmospheric pressure. The duration of the experiments was scheduled to be around 3 hours. The goal of the experiments was to assess the viability of each solvent to be part of a 2-phase system with an aqueous acid medium.

The first set of experiments carried out was a control where there was no organic phase present in the reaction vessel. Hence, this control would allow to determine the increase in efficiency (if any) by using an approach according to the present invention. Each composition was exposed to a wood sample, a lignin control and a cellulose control.

Commercially available lignin (Sigma-Aldrich; Lignin, kraft; Prod #471003) was also used as a control in the testing.

Commercially available cellulose (Sigma-Aldrich; Cellulose, fibres (medium); Prod #C6288) was also used as a control in the testing.

The use of lignin and cellulose controls allow the determination of the extent of reaction of the composition when exposed to a lignocellulosic material, in this case, wood shavings. This allows one to assess whether the composition tested is too reactive against cellulose or not sufficiently reactive enough to dissolve all of the pure lignin control.

Table 1 displays the results of a series of 3 control experiments where there are varying ratios of sulfuric acid, hydrogen peroxide and modifying agent (taurine).

TABLE 1

Control Experiments of delignification of lignocellulosic feedstock using sulfuric acid, hydrogen peroxide and a modifying agent in various ratios at room temperature and atmospheric pressure

| No organic solvent | | | Blend | recovery [mass %] | | |
|---|---|---|---|---|---|---|
| $H_2SO_4$ | $H_2O_2$ | Taurine | (moles) | wood | lignin | cellulose |
| 1 | 3 | 0 | 1:3:0 | 78.07% | 48.12% | 89.47% |
| 2 | 6 | 1 | 2:6:1 | 84.12% | 51.17% | 94.87% |

TABLE 1-continued

Control Experiments of delignification of lignocellulosic feedstock using sulfuric acid, hydrogen peroxide and a modifying agent in various ratios at room temperature and atmospheric pressure

| No organic solvent | | | Blend | recovery [mass %] | | |
|---|---|---|---|---|---|---|
| $H_2SO_4$ | $H_2O_2$ | Taurine | (moles) | wood | lignin | cellulose |
| 3 | 9 | 1 | 3:9:1 | 83.76% | 53.75% | 92.82% |

Table 2 displays the results of a series of 3 experiments where there are varying ratios of sulfuric acid, hydrogen peroxide and modifying agent (taurine) and where there is toluene present as a holding phase (organic solvent).

TABLE 2

Experiments of delignification of lignocellulosic feedstock using an aqueous composition of sulfuric acid, hydrogen peroxide and a modifying agent in various ratios in a 2-phase system comprising toluene as holding phase solvent at room temperature and atmospheric pressure

| 1:1 wt:wt Aq:toluene | | | Blend | recovery [mass %] | | |
|---|---|---|---|---|---|---|
| $H_2SO_4$ | $H_2O_2$ | Taurine | (moles) | wood | lignin | cellulose |
| 1 | 3 | 0 | 1:3:0 | 78.06% | 52.31% | 90.41% |
| 2 | 6 | 1 | 2:6:1 | 87.16% | 57.5% | 90.65% |
| 3 | 9 | 1 | 3:9:1 | 76.32% | 50.83% | 91.4% |
| 10 | 10 | 1 | 10:10:1 | 51.51% | 16.47% | 93.7% |

When toluene was utilized as the holding phase, the reaction rate increases markedly, potentially due to the formation of toluenesulfonic acid. The toluene does not indicate a discernable change in color, however the bleaching effect of the system is rapid. It takes less than 24 hours to fully bleach a wood shavings sample. In the above instances, the experiments were terminated after less than 3 hours.

Table 3 displays the results of a series of 3 experiments where there are varying ratios of sulfuric acid, hydrogen peroxide and modifying agent (taurine) and where there is ethyl acetate present as a holding phase (organic solvent).

TABLE 3

Experiments of delignification of lignocellulosic feedstock using an aqueous composition of sulfuric acid, hydrogen peroxide and a modifying agent in various ratios in a 2-phase system comprising Ethyl acetate as holding phase solvent at room temperature and atmospheric pressure

| 1:1 wt:wt Aq:EtOAc | | | Blend | recovery [mass %] | | |
|---|---|---|---|---|---|---|
| $H_2SO_4$ | $H_2O_2$ | Taurine | (moles) | wood | lignin | cellulose |
| 1 | 3 | 0 | 1:3:0 | 81.71% | 0.00% | 86.44% |
| 2 | 6 | 1 | 2:6:1 | 87.17% | 0.00% | 93.33% |
| 3 | 9 | 1 | 3:9:1 | 83.89% | 0.00% | 93.02% |

Table 4 displays the results of a series of 3 experiments where there are varying ratios of sulfuric acid, hydrogen peroxide and modifying agent (taurine) and where octanoic acid is present as a holding phase (organic solvent).

TABLE 4

Experiments of delignification of lignocellulosic feedstock using an aqueous composition of sulfuric acid, hydrogen peroxide and a modifying agent in various ratios in a 2-phase system comprising octanoic acid as holding phase solvent at room temperature and atmospheric pressure

| 1:1 wt:wt Aq:Octanoic acid | | | Blend | recovery [mass %] | | |
|---|---|---|---|---|---|---|
| $H_2SO_4$ | $H_2O_2$ | Taurine | (moles) | Wood | lignin | cellulose |
| 1 | 3 | 0 | 1:3:0 | 81% | 81% | 136% |
| 2 | 6 | 1 | 2:6:1 | 95% | 66% | 112% |
| 3 | 9 | 1 | 3:9:1 | 87% | 39% | 88% |

Table 5 displays the results of a series of 4 experiments where there are varying ratios of sulfuric acid, hydrogen peroxide and modifying agent (taurine) and where iso-octane is present as a holding phase (organic solvent). It is to be noted that i-Octane has almost the same boiling point as water (99.3° C.) but is not miscible with it (easy decanting separation). It is a good organic, inert solvent and is widely used in GCMS analysis. It is also readily available.

TABLE 5

Experiments of delignification of lignocellulosic feedstock using an aqueous composition of sulfuric acid, hydrogen peroxide and a modifying agent in various ratios in a 2-phase system comprising iso-octane as holding phase solvent at room temperature and atmospheric pressure

| 1:1 wt:wt Aq:Iso-octane | | | Blend | recovery [mass %] | | |
|---|---|---|---|---|---|---|
| $H_2SO_4$ | $H_2O_2$ | Taurine | (moles) | wood | lignin | cellulose |
| 1 | 3 | 0 | 1:3:0 | 70% | 51% | 92% |
| 2 | 6 | 1 | 2:6:1 | 92% | 63% | 112% |
| 3 | 9 | 1 | 3:9:1 | 70% | 41% | 93% |
| 10 | 10 | 1 | 10:10:1 | 47.69% | 31.73% | 99.02% |

When ethyl acetate is used as the holding phase the reaction rate does not increase as much, but the holding phase seems to take up more colored products than other hydrocarbons tested.

Table 6 displays the results of a series of 3 experiments where there are varying ratios of sulfuric acid, hydrogen peroxide and modifying agent (taurine) and where xylene is present as a holding phase (organic solvent).

TABLE 6

Experiments of delignification of lignocellulosic feedstock using an aqueous composition of sulfuric acid, hydrogen peroxide and a modifying agent in various ratios in a 2-phase system comprising xylene as holding phase solvent at room temperature and atmospheric pressure

| 1:1 wt:wt Aq:xylene | | | Blend | recovery [mass %] | | |
|---|---|---|---|---|---|---|
| $H_2SO_4$ | $H_2O_2$ | Taurine | (moles) | wood | lignin | cellulose |
| 2 | 6 | 1 | 2:6:1 | 85.0% | 57.7% | 99.2% |
| 3 | 9 | 1 | 3:9:1 | 65.2% | 59.7% | 99.9% |
| 10 | 10 | 1 | 10:10:1 | 52.17% | 10.79% | 93.7% |

Table 7 displays the results of a series of 3 experiments where there are varying ratios of sulfuric acid, hydrogen peroxide and modifying agent (taurine) and where hexane is present as a holding phase (organic solvent).

TABLE 7

Experiments of delignification of lignocellulosic feedstock
using an aqueous composition of sulfuric acid, hydrogen
peroxide and a modifying agent in various ratios in a
2-phase system comprising hexane as holding phase solvent
at room temperature and atmospheric pressure

| 1:1 wt:wt Aq:hexane | | | Blend | recovery [mass %] | | |
|---|---|---|---|---|---|---|
| $H_2SO_4$ | $H_2O_2$ | Taurine | (moles) | wood | lignin | cellulose |
| 2 | 6 | 1 | 2:6:1 | 79.8% | 60.8% | 99.2% |
| 3 | 9 | 1 | 3:9:1 | 71% | 58.9% | 99.6% |
| 10 | 10 | 1 | 10:10:1 | 50.01% | 7.36% | 96.37% |

Table 8 displays the results of an experiment where sulfuric acid, hydrogen peroxide and a modifying agent (taurine) are used in the presence of HT-40 (holding phase—organic solvent).

TABLE 8

Experiments of delignification of lignocellulosic feedstock
using an aqueous composition of sulfuric acid, hydrogen
peroxide and a modifying agent in various ratios in
a 2-phase system comprising HT-40 as holding phase solvent
at room temperature and atmospheric pressure

| 1:1 wt:wt Aq:HT-40 | | | Blend | recovery [mass %] | | |
|---|---|---|---|---|---|---|
| $H_2SO_4$ | $H_2O_2$ | Taurine | (moles) | wood | lignin | cellulose |
| 10 | 10 | 1 | 10:10:1 | 63.1% | 51.3% | 97.4% |

Preferably, the second phase should be large enough to hold as much as possible reaction product. According to a preferred embodiment, the holding phase, made up of a hydrophobic fluid, should have a volume having of at least half the volume of the reaction phase and up to a maximum of twice volume of the reaction phase.

According to a preferred embodiment, the reaction phase comprises a mineral acid and a source of peroxide.

According to another preferred embodiment, the reaction phase comprises a modified mineral acid and a source of peroxide. The modified acid is created by combining a mineral acid such as sulfuric acid with a compound comprising an amine moiety and a sulfonic acid moiety selected from the group consisting of: taurine and derivatives thereof such as taurine-related compounds; wherein the sulfuric acid and said amine-containing compound are present in a mole ratio ranging from 3:1 to 100:1. More preferably, the sulfuric acid and said amine-containing compound are present in a mole ratio ranging from 5:1 to 50:1. Even more preferably, the sulfuric acid and said amine-containing compound are present in a mole ratio ranging from 5:1 to 10:1.

Preferably, the modifying agent selected from the group consisting of: imidazole; n-alkylimidazole; taurine; a taurine derivative; a taurine-related compound; alkylsulfonic acid; aryl sulfonic acid; triethanolamine; and combinations thereof. Preferably, the alkylsulfonic acid is selected from the group consisting of: methanesulfonic acid; ethanesulfonic acid; sulfamic acid and combinations thereof. Preferably, the aryl sulfonic acid is selected from the group consisting of: toluenesulfonic acid; benzenesulfonic acid; and combinations thereof. Preferably, said taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

Dermal Corrosiveness Testing

The modified acid+peroxide composition was compared to a conventional acid+peroxide composition to assess the immediate dermal corrosiveness. The modified acid composition (with peroxide) provided substantial protection to dermal tissue when compared to the conventional acid composition (with peroxide). This substantiates the additional safety of this type of modified acid in combination with a peroxide compared to an acid without a modifier present.

The embodiments described herein are to be understood to be exemplary and numerous modification and variations of the present invention are possible in light of the above teachings. It is therefore to be understood that within the scope of the claims appended hereto, the invention may be practiced otherwise than as specifically disclosed herein.

The invention claimed is:

1. A method for controlled delignification of lignocellulosic feedstock, said method comprising the steps of:
   providing a reactive phase of pH less than 1, said reactive phase comprising:
      water;
      sulfuric acid;
      a source of peroxide;
      a modifying agent, said modifying agent adapted to control the reactivity of the sulfuric acid;
   providing a holding phase, said holding phase comprising an organic solvent which does not react with the aqueous acidic composition;
   combining said reactive phase and holding phase to form a reaction mixture;
   exposing a lignocellulosic material to said reaction mixture for a period of time sufficient to allow delignification of the lignocellulosic material.

2. The method according to claim 1 where the reactive phase and the holding phase are present in a weight ratio ranging from 2:1 to 1:2.

3. The method according to claim 1 where the reactive phase and the holding phase are present in a weight ratio ranging from 1.5:1 to 1:1.5.

4. The method according to claim 1 where the holding phase comprises a solvent selected from the group consisting of: ethyl acetate; propyl acetate; butyl acetate; and combinations thereof.

5. The method according to claim 1 where the sulfuric acid and the source of peroxide are present in a molar ratio ranging from 3:1 to 1:3.

6. The method according to claim 1 where the sulfuric acid and the modifying agent are present in a molar ratio ranging from 10:1 to 1:10.

7. The method according to claim 1 where the sulfuric acid and the modifying agent are present in a molar ratio ranging from 3:1 to 1:3.

8. The method according to claim 1 where the modifying agent is selected from the group consisting of: imidazole; n-alkylimidazole; taurine; a taurine derivative; a taurine-related compound; alkylsulfonic acid; aryl sulfonic acid; triethanolamine; and combinations thereof.

9. The method according to claim 8 where the taurine derivative or taurine-related compound is selected from the group consisting of: sulfamic acid; taurolidine; taurocholic acid; tauroselcholic acid; tauromustine; 5-taurinomethyluridine and 5-taurinomethyl-2-thiouridine; homotaurine (tramiprosate); acamprosate; and taurates.

10. The method according to claim 1 where the period of time sufficient to remove at least 80% of the lignin present on said plant material.

11. The method according to claim 1, wherein the amount of lignin removed is more than 90%.

12. A one-pot process to separate lignin from a lignocellulosic feedstock, said process comprising the steps of:
provide a vessel;
providing said lignocellulosic feedstock;
providing a composition comprising;
an acid;
a modifying agent; and
a peroxide;
exposing said lignocellulosic feedstock to said composition in said vessel for a period of time sufficient to remove at least 80% of the lignin present in said lignocellulosic feedstock;
optionally, removing a liquid phase comprising dissolved lignin fragments from a solid phase comprising cellulose fibres.

13. The process according to claim 12, wherein the modifying agent selected from the group consisting of: sulfamic acid; imidazole; n-alkylimidazole; taurine; a taurine derivative; a taurine-related compound; alkylsulfonic acid; aryl sulfonic acid; triethanolamine; and combinations thereof.

14. The process according to claim 13, wherein the alkylsulfonic acid is selected from the group consisting of: methanesulfonic acid; ethanesulfonic acid; propanesulfonic acid and combinations thereof.

15. The process according to claim 13, wherein the aryl sulfonic acid is selected from the group consisting of: toluenesulfonic acid; benzenesulfonic acid; and combinations thereof.

16. The process according to claim 12, wherein the initial temperature of the composition prior to the step of exposing it to the lignocellulosic feedstock is below 50° C.

17. The method according to claim 12, wherein the period of time is sufficient to remove at least 90% of the lignin present on said plant material.

18. A one-pot process to separate lignin from a lignocellulosic feedstock, said process comprising the steps of:
providing a vessel;
providing said lignocellulosic feedstock;
providing a composition comprising;
an acid;
a modifying agent;
a peroxide;
exposing said lignocellulosic feedstock to said composition in said vessel creating a reaction mixture, wherein the exposure is done for a period of time sufficient to remove at least 80% of the lignin present said lignocellulosic feedstock;
exposing the reaction mixture to a water immiscible solvent;
separating a liquid phase comprising:
said water immiscible solvent; and
dissolved lignin fragments;
from a solid phase comprising cellulose fibres.

19. The one-pot process according to claim 18, wherein the water immiscible solvent is selected from the group consisting of: ethyl acetate; propyl acetate; butyl acetate; and combinations thereof.

20. The one-pot process according to claim 18, wherein the water immiscible solvent is selected from the group consisting of: xylene; hexane; toluene and combinations thereof.

* * * * *